(12) United States Patent
Trohel et al.

(10) Patent No.: US 10,808,537 B2
(45) Date of Patent: Oct. 20, 2020

(54) TURBINE COMPRISING A VENTILATION SYSTEM BETWEEN ROTOR AND STATOR

(71) Applicant: SAFRAN AIRCRAFT ENGINES, Moissy-Cramayel (FR)

(72) Inventors: Mathieu Jean Pierre Trohel, Moissy-Cramayel (FR); Paco Maurer, Moissy-Cramayel (FR)

(73) Assignee: SAFRAN AIRCRAFT ENGINES, Moissy-Cramayel (FR)

(*) Notice: Subject to any disclaimer, the term of this patent is extended or adjusted under 35 U.S.C. 154(b) by 122 days.

(21) Appl. No.: 16/259,084

(22) Filed: Jan. 28, 2019

(65) Prior Publication Data

US 2019/0162069 A1     May 30, 2019

Related U.S. Application Data

(63) Continuation-in-part of application No. PCT/FR2017/052055, filed on Jul. 25, 2017.

(30) Foreign Application Priority Data

Jul. 29, 2016 (FR) .................................. 16 57439

(51) Int. Cl.
*F01D 5/08* (2006.01)
*F01D 25/12* (2006.01)

(52) U.S. Cl.
CPC ............. *F01D 5/085* (2013.01); *F01D 5/082* (2013.01); *F01D 25/12* (2013.01);
(Continued)

(58) Field of Classification Search
CPC ........... F01D 5/085; F01D 5/087; F01D 5/088
(Continued)

(56) References Cited

U.S. PATENT DOCUMENTS 2,951,340 A * 9/1960 Howald .................... F02C 7/18
60/806
3,575,528 A * 4/1971 Beam, Jr. .................. F01D 5/08
416/39
(Continued)

FOREIGN PATENT DOCUMENTS

EP          0 785 338 A1     7/1997
EP          0 926 315 A2     6/1999
(Continued)

OTHER PUBLICATIONS

International Search Report for PCT/FR2017/052055, dated Nov. 15, 2017.
Preliminary French Search Report for FR 1657439.

*Primary Examiner* — Moshe Wilensky
*Assistant Examiner* — Jason Mikus
(74) *Attorney, Agent, or Firm* — Oblon, McClelland, Maier & Neustadt, L.L.P.

(57) ABSTRACT

In order to compensate for the increase in a leakage rate of ventilation air originating in a circuit via a labyrinth seal that gradually wears at the bottom of a ventilation chamber, and the reduction of a purge rate via an opening upstream from the chamber, a second injection opening is added to a main injection opening. The second injection opening communicates with the chamber via a second labyrinth seal that wears at the same time as the first, and thus gradually increases the air flow rate passing through the injector in order to compensate for the additional leakage rate through the first injector and maintain the ventilation at its initial level.

15 Claims, 3 Drawing Sheets

(52) U.S. Cl.
CPC .. *F05D 2240/81* (2013.01); *F05D 2260/6022* (2013.01); *Y02T 50/676* (2013.01)

(58) Field of Classification Search
USPC ...................................................... 415/168.1
See application file for complete search history.

(56) References Cited

U.S. PATENT DOCUMENTS

| | | | | | |
|---|---|---|---|---|---|
| 3,989,410 | A | * | 11/1976 | Ferrari | F01D 3/00 |
| | | | | | 415/115 |
| 4,217,755 | A | * | 8/1980 | Williams | F02C 7/18 |
| | | | | | 415/115 |

FOREIGN PATENT DOCUMENTS

| | | |
|---|---|---|
| EP | 1 503 061 A1 | 2/2005 |
| WO | 2010/142682 A1 | 12/2010 |
| WO | 2014/189589 A2 | 11/2014 |

* cited by examiner

TURBINE COMPRISING A VENTILATION SYSTEM BETWEEN ROTOR AND STATOR

CROSS-REFERENCE TO RELATED APPLICATIONS

The present application is a continuation-in part of International Application No. PCT/FR2017/052055, which was filed on Jul. 25, 2017. International Application No. PCT/FR2017/052055 claims priority to French Patent Application No. FR 16 57439, which was filed on Jul. 29, 2016. The entire contents and disclosure of each of the above-identified applications is incorporated by reference herein.

The present invention relates to a turbine comprising a ventilation system between a stator and a rotor, or more generally two bodies rotating with respect to one another and which can thus consist of two rotors, counter-rotating for example.

Numerous turbomachines are provided with a ventilation system, intended to cool hot portions of their turbine by a permanent blowing of cool air. They comprise a ventilation circuit extending in the stator, from a tap for drawing off pressurised cool air, coming for example from one of the compressors of the turbomachine, to a chamber defined by the structures to be cooled, and from which the gas flows through various taps and gaps. The pressure of the air propels it from one end of the circuit to the other. Cooling by a heat exchanger can also be carried out. The documents describing such ventilation systems are also numerous; one example is EP-1 503 061-A.

A particular situation exists when the chamber is defined both by the stator and the rotor, since it comprises two concentric gaps of junction of the rotor with the stator, through which the air blown in can flow. Typically, one of these gaps can open into the jet of flow of the gases, and allow a purge flow rate towards the jet, in order to prevent the intakes of the very hot gases that circulate therein into the chamber and other cavities of the machine; and the other gap is occupied by a sealing joint, in general a labyrinth seal nevertheless allowing a leak flow rate out of the chamber, which is used to confine the atmosphere of a cavity located beyond the sealing joint. This cavity, in usual structures, indeed contains a bearing lubricated by oil and a portion of which is in suspension. The chamber must be at a sufficient pressure with respect to the gases of the jet. The cavity beyond the sealing joint is generally under vacuum because of the systems for recovering oil, which ensures the correct direction of the leak flow rate, and the leak flow rate is small with respect to the purge flow rate.

The device is designed in order for the purge flow rate and the leak flow rate through these two gaps to be present under all circumstances, as well as ventilation flow rates. The ventilation flow rates represent the rest of the total flow rate flowing in the circuit, and which leaves the chamber through ventilation taps disposed at the discs of turbines in order to ventilate them. But the labyrinth sealing joints wear down when in use: they are often composed of rigid circular blades, called fins, the free end of which faces pads of a material called abradable; the transitory operations of the machine make irregularities in heating between the rotor and the stator and differential thermal expansions appear, which make the fins temporarily rub on the abradable material, which cuts into it and enlarges, little by little, the gap in the labyrinth seals, and the leak flow rate. Worn labyrinth seals thus let a greater leak flow rate pass through, and the purge flow rate decreases. If it became negative, the purge would be replaced by an intake of the hot gases of the jet of flow, which would be unacceptable. It is thus required to provide a purge flow rate greater than necessary in order to guarantee that a purge will remain even when the sealing joint is very worn, with, however, the negative consequence that the flow rate flowing through the ventilation circuit and drawn off from the main flow of the gases must be increased for this single reason.

The goal of the invention is therefore to improve such ventilation systems in order to make the purge flow rate between the stator and the rotor (or more generally two bodies rotating with respect to one another) not highly dependent on the wear of a sealing joint located elsewhere between the stator and the rotor at the end of a ventilation chamber.

In a general aspect, the invention thus relates to a turbine comprising two bodies rotating with respect to one another, a ventilation chamber defined by the bodies and comprising at least one opening for purge to a jet of the turbine at a first side of the chamber and a second opening, occupied by a first sealing joint having a leak flow rate, disposed between the bodies at a second side of the chamber and leading to an enclosure with respect to which the chamber is at overpressure, a ventilation circuit present in a first of the bodies, extending up to a partition separating it from the chamber, and leading to the chamber via a first injection orifice passing through the partition, characterised in that it comprises a second injection orifice passing through the partition, and through which the ventilation circuit leads to an antechamber defined by portions of the bodies and having an antechamber opening occupied by a second sealing joint having a leak flow rate, said antechamber opening leading exclusively to the chamber, and in that the first sealing joint and the second sealing joint are labyrinth seals that have elements responsible for the sealing, comprising circular rigid fins and abradable pads extending in front of edges of the fins, that are carried by portions of the bodies all oriented in the same direction.

When the first sealing joint at the outlet of the chamber wears down because of the differential thermal expansions between the rotor and the stator, or more generally between the two bodies in relative rotation, the same applies to the second joint upstream of it in the direction of the ventilation, and the corresponding injection orifice lets through a greater flow rate, which contributes to the increase in the flow rate through the first joint, while the flow rate passing through the first injection orifice, essential to the formation of the purge flow rate, remains more or less constant. This effect is easily obtained if the first sealing joint and the second sealing joint have elements that create the sealing that are oriented in the same direction, since the wear on the joints is then comparable. The effects characteristic of the invention are thus easily verified with labyrinth seals comprising fins and abradable pads.

A device conducive to properly carrying out the invention is obtained if the second injection orifice is located between the first injection orifice and the first sealing joint, and the first injection orifice is located between the purge orifice and the second injection orifice.

Other aspects of the invention are a turbomachine comprising a turbine according to any one of the above features wherein the turbine is in particular a low-pressure (or high-pressure) turbine, and one of the bodies is the low-pressure (or high-pressure) body of the turbomachine; as well as an aircraft comprising this turbomachine.

The various aspects, features and advantages of the invention will now be described in more detail via the following drawings, which detail certain specific embodiments thereof, not exclusive of others:

These drawings show a turbine according to the invention, which allows to more efficiently carry out the purge of the jet (jet sealing) and the ventilation of the under-turbine enclosure, and the oil enclosure sealing.

Figure 1:
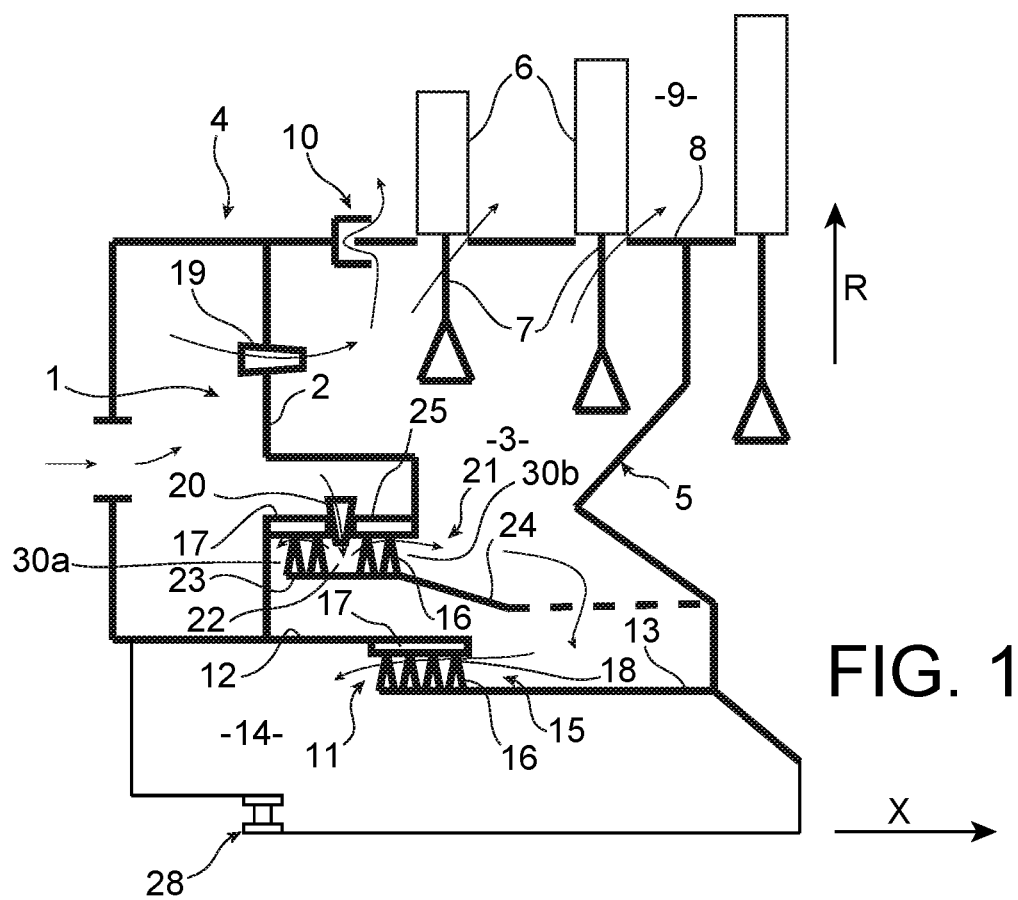
FIGS. 1, 2 and 3 illustrate, respectively, three embodiments of the invention, applied to a low-pressure turbine of a turbomachine.

In the present invention, and as shown in FIG. 1, a circuit for drawing ventilation air as defined at the beginning of this description (only the end 1 of which has been shown) ends on a partition 2 that separates it from a chamber 3, in which the ventilation is carried out; the chamber 3 is defined both by the stator 4, to which the partition 2 belongs, and by the rotor 5, which is the carrier in particular of mobile blades 6 to which the cooling must apply. This is why ventilation orifices 7 are made through a shroud 8 of the rotor 5, carrier of the roots of the mobile blades 6, through which the flow of ventilation air largely passes, before reaching the gases of the jet of flow 9 surrounding the shroud 8.

The chamber 3 comprises two more openings, which are circular and concentric: a purge opening 10 joining the upstream end of the shroud 8 to a facing portion of the stator 4, at the outer radial edge of the chamber 3, like the orifices 7, and a second opening 11 remaining between concentric, and approximately cylindrical ribs 12 and 13 of the stator 4 and of the rotor 5 to a radially inner area of the chamber 3.

The purge opening 10 is occupied by a labyrinth seal having a large gap created between walls extending axially and partly overlapping, through which a relatively large leak flow rate of the ventilation air, called upstream purge flow rate, is tolerated. Another leak flow rate is tolerated through the second opening 11, but greater sealing than through the purge opening 10 is in general desired, in order in particular to confine an enclosure 14 located immediately beyond it, near the axis of the rotor 5 and able to contain a lubricated bearing 28 in which the dispersion of the oil into the machine would not be acceptable.

This is why the leak opening 11 is provided with a labyrinth seal 15 having a small gap, comprising circular rigid fins 16 disposed on one of the ribs 13 and abradable pads 17 concentric to the fins 16 with respect to an axis of rotation (not shown) of the rotor 5, located on the other of the ribs 12 in front of edges 18 of the fins 16 while leaving only a small gap, which allows a reduced leak flow rate through the labyrinth seal 15 and maintains the overpressure of the chamber 3 with respect to the enclosure 14. It is known, however, that the operation of the machine leads to transitory states in which the rotor 5 heats up faster than the stator 4 and thus expands more than it, in such a way that the edges 18 of the fins 16 enter the abradable pads 17 and dig into them, while thus enlarging the gaps of stable operation of the labyrinth once these differential thermal expansions have disappeared. As a result, the leak flow rate passing through the second opening 11 increases as the labyrinth seal 15 wears down in this manner. The other flow rates of flow out of the chamber 3 are consequently reduced, and in particular the upstream purge flow rate through the purge opening 10. In order to prevent an inversion of this flow rate, it must therefore be provided with a rather large initial value, to the detriment of the flow rate flowing through the ventilation orifices 7. The purge flow rate is of the same order of magnitude as the sealing flow rate and the leak cross-section of the sealing is smaller than that of the purge. For new sealing, the purge flow rate is greater than that of the sealing, but the reverse is true for old sealing.

In order to prevent this situation as much as possible, a complex connection is provided between the end 1 of the circuit and the chamber 3 through the partition 2.

Next to at least one first injection orifice 19 provided with a first injector that makes the end 1 of the circuit communicate directly with the chamber 3, there is at least one second injection orifice 20, provided with another injector, that opens in front of a second labyrinth sealing joint 21 formed by two portions included in the chamber 3, and opens more precisely into an antechamber 22 included in this second joint 21, between two of its fins 16. The second joint 21 separates the antechamber 22 from the chamber 3 and occupies the opening of the antechamber 22 that leads to the chamber 3. The opening of the antechamber is composed here of two respective portions 30a and 30b of the second joint 21 (the portions that the antechamber 22 separates). The antechamber 22 does not have any other opening by which the ventilation air could leave it for the chamber 3 or any other enclosure: the antechamber 22 thus leads exclusively to the chamber 3, and through the second joint 21. The permeability through the second injection orifice 20 is greater than through the second joint 21, which thus determines the flow rate passing through the antechamber 22 and reaching the chamber 3. The joints 15 and 21 are indeed of the same type and oriented in the same way, that is to say that their fins 16 are here all oriented radially towards the outside, and the free faces of the abradable pads 17 are here all oriented radially towards the inside. The fins 16 of the second joint 21 are carried by a cylindrical portion 23 of rotor 5, supported by arms 24 that connect it to the rest of the rotor 5 without dividing the volume of the chamber 3, while forming a discontinuous support extending through the chamber 3 between the first injection orifice 19 and the first joint 15. Here, the abradable pads 17 are mounted on a supporting part 25 of the partition 2 concentric to the rib 12. More generally, the abradable pads 17 and the alignments of the fins 16 that are facing them, as well as the gaps separating them, are oriented in the same direction, here the axial direction X of the machine since they are all defined by cylindrical portions (12, 13, 23 and 25) of the bodies 4 and 5, concentric to their axis of relative rotation. Orientations other than axial, caused by support portions other than cylindrical of the joints 15 and 21, would also belong to the invention.

Successively in the increasing radial direction R, there are: the second opening 11 and the first joint 15 provided therein, the second injection orifice 20 and the second joint 21 provided therein, the first injection orifice 19, and finally the purge orifice 10 and the ventilation orifices 7. The second joint 21 is favourably disposed between the purge opening 10 on the one hand, the second opening 11 and the labyrinth seal 15 on the other hand, along the partition 2 (and at an intermediate radius in the usual case in which these openings are distant mainly radially by the much different radii, or optionally at an intermediate axial position in which they are distant mainly in the axial direction of the machine): the second joint 21 is in any case entirely inside the chamber 3. It is moreover completely separate from the joint 15.

The flow rate of the ventilation circuit thus passes through the chamber 3 substantially by the first injection orifice 19, while the flow rate passing through the second injection orifice 20 is impeded by the second sealing joint 21. But as the first sealing joint 15 wears down, the second sealing joint 21 wears down at a similar or analogous rate, because of the similarity in structure and in placement at the junction of the stator 4 and the rotor 5, which facilitates the flow by the second injection orifice 20 and increases its flow rate. Since the end 1 does not have any outlets other than the injection orifices 19 and 20, which could constantly deviate a portion of the flow rate of ventilation, the wear of the second sealing joint 21 is necessarily accompanied by an increase in the flow rate leaking through it.

This increase in flow rate is preferably assigned to the leak flow rate through the first sealing joint 15, which is closer to the second injection orifice 20: as a result, the upstream purge flow rate passing through the purge opening 10 does not change a lot during the use of the machine, which allows to provide it at a low value initially and thus increase the useful portion of the ventilation flow rate passing through the orifices 7. The number of the fins 16 on either side of the antechamber 22 is identical. Preferably, the second sealing joint 21 has less fins 16 than the first sealing joint 15 since it compensates for the degradation in the sealing of the latter without assuming its own sealing.

Figure 2:
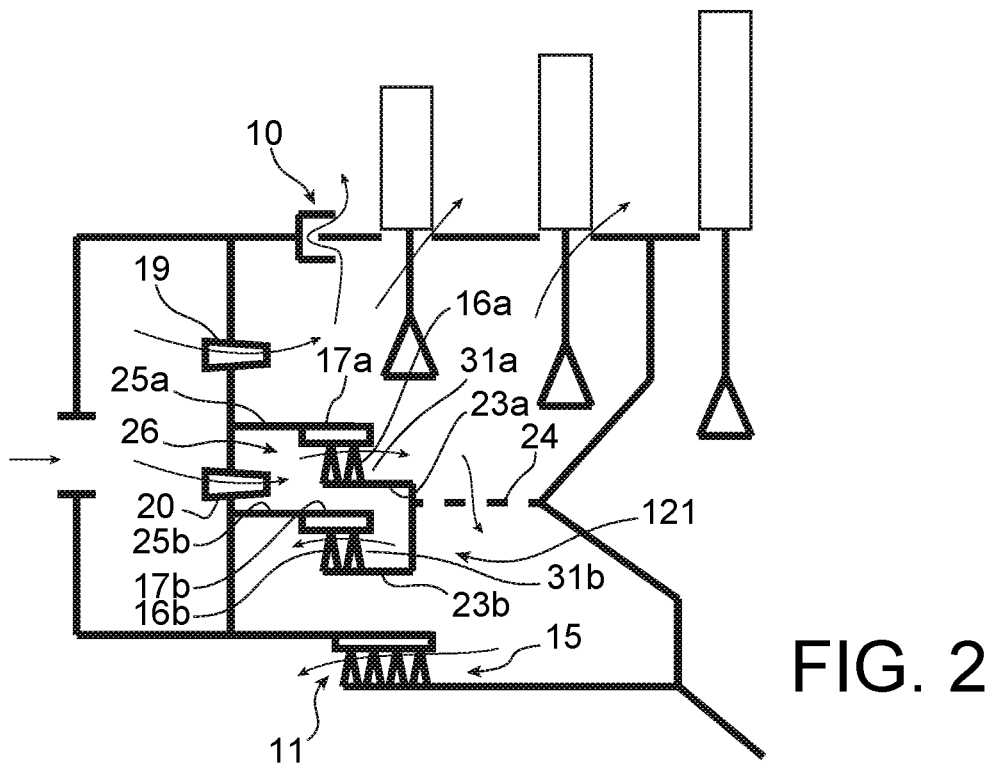
Figure 3:
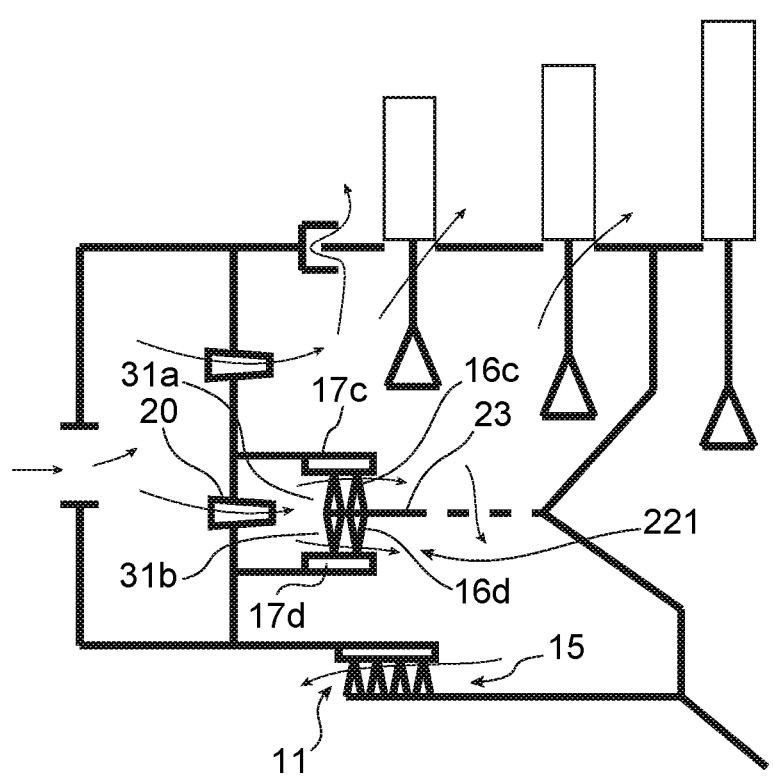

Among other embodiments of the invention, those of FIGS. 2 and 3 should be disclosed, which differ from the previous one by the arrangement of the second labyrinth seal.

In FIG. 2, there is a labyrinth seal 121 divided into two sealing portions, comprising two concentric circles of abradable pads 17a and 17b, disposed on two also concentric cylindrical supporting parts 25a and 25b rigidly connected to the partition 2 and replacing the single supporting part 25, the second injector 20 continuous between these two portions 25a and 25b passing through the partition 2; and two groups of fins 16a and 16b, the edges of which respectively come in front of the circles of pads 17a and 17b, and which are mounted on concentric ribs 23a and 23b, also rigidly connected to the arm 24 and forming a shared support. There could also be separate supports for the two ribs 23a and 23b.

The supporting parts 25a and 25b, the partition 2 between them, and the ribs 23a and 23b together define an almost closed volume that constitutes an antechamber 26 to the chamber 3, into where the second injection orifice 20 opens. The flow rate of air entering the antechamber 26 reaches the chamber 3 by the two labyrinths formed by the joint 121. Here again, the goal of the antechamber 26 is for the air that enters the chamber 3 to not be limited by the cross-section of the injector, but by the cross-section of the labyrinth seal 120. It is therefore necessary to have an injector cross-section (at the second injection orifice 20) larger than the cross-section of the labyrinth seal 120.

The operation of this device is the same as the previous one, because, since the fins 16a and 16b are disposed in the same direction as the fins 11 of the first joint 16, the wear of the two portions of the joint 121 progresses at the same time as that of the first joint 16 thus progressively lets through a greater flow rate of air by the second injection orifice 20. Advantageously, the first sealing joint 15 and the second sealing joint 21, 121 or 221 are close to one another, that is to say with a spacing reduced in their main direction of extension (here, axial) in order for their gaps (in the perpendicular direction, here radial) to be subjected to variations that are as close as possible. Advantageously, the two sealing joints 15 and 21, 121 or 221 at least partly overlap in this main direction.

A closeness of the two sealing joints 15 and 21, 121 or 221 in their direction perpendicular to their main extension (here, in their radial direction) can also be desired, with the same effect of equalising the expansions to which they are subjected and their wear.

In a slightly different design shown in FIG. 3 and suitable for giving equally good results, the second joint 21 or 121 is replaced by a second joint 221 mounted, like in FIG. 1, on a cylindrical, single support 23 and comprising, like in FIG. 2, a double series of fins, here labelled 16c and 16d, and two abradable pads 17c and 17d, concentric but oriented one towards the other, whereas the edges of the fins 16c and 16d are disposed in the divergent directions on either side of the shared support 23. The second injector 20 is placed in the same way as in FIG. 2. Here again, the air passing through the second injector 20 reaches the antechamber 26, from which it exits by the double labyrinth formed in the joint 221. Like in the previous examples, the wear of the first joint 11 is accompanied by the wear of the second joint 221 and by the progressive increase in the flow rate of air that passes through it, and compensates for the increase in the flow rate of air passing through the first joint 221, to the extent that the upstream purge flow rate passing through the opening 10 remains substantially constant.

Like in the previous embodiment, the antechamber 26 leads exclusively to the chamber 3, and through the second sealing joint 121; and the corresponding opening of the antechamber 26 comprises two portions 31a and 31b, which respectively occupy the two portions of the joint 121, without this division having any importance for the invention and its operation.

The injectors of the injection orifices 19 and 20 can take on the appearance of nozzles having an inlet orifice, an outlet orifice, and a chamber having a greater cross-section between the orifices. Other equipping of the injection orifices 19 and 20 is, however, possible. Likewise, the invention is not limited to radial orientations of sealing elements such as fins.

All the embodiments of the invention can be applied while switching their components on the rotor and the stator, and more generally on the first and the second of the bodies.

A specific embodiment of the invention will now be described via FIG. 4. It comprises, on the right of the drawing, a sealing device 301 similar to the above description, for example that of FIG. 1, the rotor 5 being a rotor of a low-pressure turbine. This embodiment is original in that it comprises a second sealing device 302, located next to the previous one in the axial direction X, and more precisely upstream. The two sealing devices 301 and 302 are both served by the same ventilation device, the end of which is a chamber 303 located between the sealing devices 301 and 302 and defined in particular by two partitions 2 and 2a, approximately parallel to one another and perpendicular to the axial direction X: the partition 2 separates the chamber 303 from the downstream sealing device 301, and the opposite partition 2a separates it from the new sealing device 302. The supply occurs here through an inter-turbine casing 304 that passes through the jet of flow 9 while extending a supply pipe 305 that extends in an outer casing 306, a wall of which defines the outer contour of the jet of flow 9.

The second sealing device 302 is established between the second wall 2a of the chamber 303 and a rotor of a high-pressure turbine 307, more precisely a portion of said rotor that is a disc 308 carrying a last stage of blades 309 of the high-pressure turbine. The second sealing device 302 is similar to one or the other of the previous embodiments, or of any other embodiment according to the invention and similar or not to the first sealing device 301. Here, it is composed of two injectors 19a and 20a, and two joints 21a and 15a, respectively similar to the injectors 19 and 20 and to the joints 21 and 15 of the first sealing device 301. In particular, the joints 21a and 15a comprise fins 116, abradable pads 117, and the second joint 21a comprises an antechamber 122 into which the injector 20a opens, in accordance with the description of FIG. 1 regarding the first sealing device, now-labelled as 301. The description of this device of FIG. 1 also applies to the latter. The ventilation air exits the second sealing device 302 either by a purge opening 10a analogous to the opening 10, but extending between the inter-turbine casing 304 and the disc 308, or by the second joint 15a in order to reach the enclosure 14 housing the bearing 28, or another enclosure. The air passing through the second injector 20a must first pass through the first joint 21a, like above. This embodiment is particularly compact since the sealing devices 301 and 302 are supplied by a shared means, while only interposing the end chamber 303, which can be narrow in the axial direction X, between the turbine rotor bodies 5 and 307 in succession in this direction.

Figure 4:
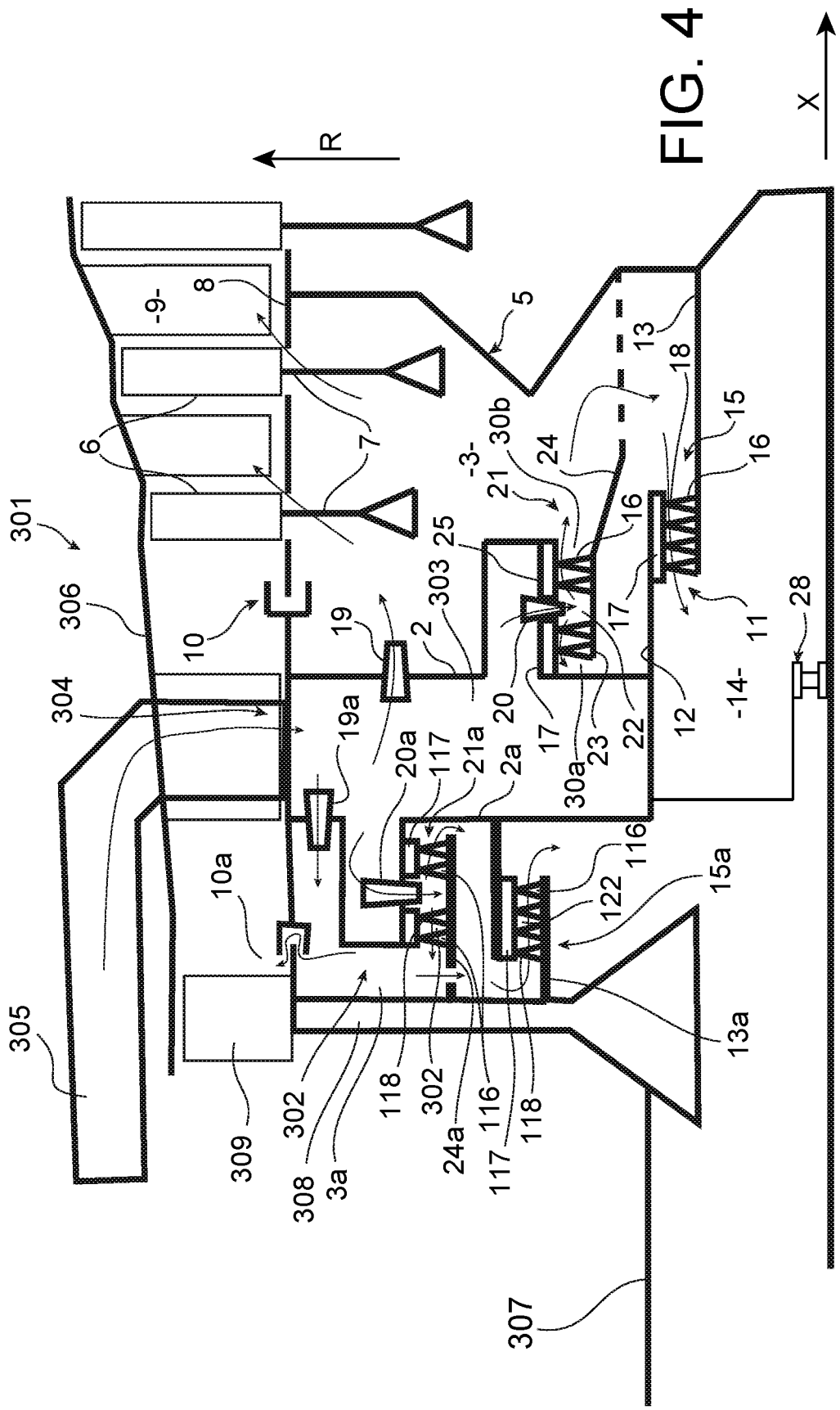
FIG. 4 illustrates another embodiment of the invention, applied in particular to a high-pressure turbine of the turbomachine.

The device of the left half of FIG. 4, relative to a high-pressure turbine, could be used alone, the low-pressure turbine shown in the right half thus not having the device according to the invention and thus being of any type. In a corresponding embodiment of the invention, the high-pressure turbine again comprises the two bodies 304, 308 rotating with respect to one another, the ventilation chamber 3a defined by the bodies and comprising the at least one opening 10a for purge to the jet of the turbine on the first side of the chamber 3a and the second opening 15a, occupied by the first sealing joint 15a having a leak flow rate, positioned between the bodies on a second side of the chamber and leading to the enclosure 14 with respect to which the chamber 3a is at overpressure, the ventilation circuit, present in a first of the bodies 304, extending up to the partition 2a separating it from the chamber 3a, and leading to the chamber via the first injection orifice 19a passing through the partition; the high-pressure turbine is characterised in that it comprises the second injection orifice 20a passing through the partition 2a, and through which the ventilation circuit leads to an antechamber 122 defined by portions of the bodies and having the antechamber opening occupied by the second sealing joint 21a having a leak flow rate, said antechamber opening leading exclusively to the chamber 3a, and in that the first sealing joint 15a and the second sealing joint 21a are labyrinth seals that have the elements responsible for the sealing 116, 117, comprising the circular rigid fins 116 and the abradable pads 117 extending in front of the edges 118 of the fins 116, which are carried by the portions 13a, 24a of the bodies all oriented in the same direction.

The invention claimed is:

1. A turbine comprising:
   two bodies rotating with respect to one another,
   a ventilation chamber defined by the bodies and comprising at least one opening for purge to a jet of the turbine at a first side of the chamber and a second opening, occupied by a first sealing joint having a first leak flow rate, disposed between the bodies at a second side of the chamber and leading to an enclosure with respect to which the chamber is at overpressure,
   a ventilation circuit present in a first of the bodies, extending up to a partition separating the ventilation circuit from the chamber, and leading to the chamber via a first injection orifice passing through the partition,
   a second injection orifice passing through the partition, and through which the ventilation circuit leads to an antechamber defined by portions of the bodies and having an antechamber opening occupied by a second sealing joint having a second leak flow rate, said antechamber opening leading exclusively to the chamber,
   wherein the first sealing joint and the second sealing joint are labyrinth seals that have elements responsible for the sealing, comprising circular rigid fins and abradable pads extending in front of edges of the fins, that are carried by portions of the bodies all oriented in the same direction.

2. The turbine according to claim 1, wherein said portions of the bodies defining the second opening and the antechamber opening are cylindrical and concentric, and, in each of the sealing joints, the abradable pads are concentric to the fins with respect to an axis of relative rotation of the bodies.

3. The turbine according to claim 2, wherein the second injection orifice is located between the first injection orifice and the first sealing joint, and the first injection orifice is located between the purge opening and the second injection orifice in a radial direction.

4. The turbine according to claim 3, wherein the at least one opening for purge is located at an outer radius of the chamber, and the first sealing joint at an inner radius of the chamber.

5. The turbine according to claim 4, wherein a second of the bodies comprises a portion defining said antechamber, connected to a main portion of the second of the bodies by a discontinuous support extending through the chamber between the first injection orifice and the first sealing joint.

6. The turbine according to claim 2, wherein the second sealing joint is comprised of two portions respectively occupying two portions of the antechamber opening by each of which the antechamber leads to the chamber.

7. The turbine according to claim 5, wherein the second injection orifice opens directly in front of the second sealing joint, said antechamber being interior to the second sealing joint.

8. The turbine according to claim 6, wherein said antechamber is limited by two concentric walls rigidly connected to the partition, and the second sealing joint comprises two portions respectively associated with said walls and mounted on a shared support.

9. The turbine according to claim 8, wherein the portions of the second sealing joint are separate, and the shared support comprises two concentric portions respectively associated with said portions of the second sealing joint.

10. The turbine according to claim 8, wherein the portions of the second sealing joint are located on either side of the shared support.

11. The turbine according to claim 1, further comprising:
    a third body rotating at least with respect to the first body,
    wherein the ventilation circuit comprises an end chamber housed in the first body, located between the second body and the third body in an axial direction of the turbine, and defined by two opposite partitions, a first of which is said partition and a second of which leads to a second ventilation chamber defined by the first body and the third body and comprising at least one opening for purge to the jet of the turbine on a first side of the chamber and the second opening, occupied by a third sealing joint having a leak flow rate, disposed between the first body and the third body on a second side of the chamber and leading to the enclosure with respect to which the second chamber is at overpressure, the ventilation circuit leading to the chamber via a third injection orifice passing through the second partition,
    wherein the turbine further comprises a fourth injection orifice passing through the second partition, and through which the ventilation circuit leads to a second antechamber defined by portions of the first body and of the third body and having an antechamber opening occupied by a fourth sealing joint having a leak flow rate, said antechamber opening leading exclusively to the second chamber, and wherein the third sealing joint and the fourth sealing joint are labyrinth seals that have the elements responsible for the sealing, comprising circular rigid fins and abradable pads extending in front of edges of the fins, which are carried by portions of the first body and of the third body all oriented in the same direction.

12. The turbine according to claim 11, wherein the first body is an inter-turbine casing rigidly connected to a stator of the turbine.

13. The turbine according to claim 12, wherein the ventilation circuit passes through a portion of the stator that surrounds the jet and passes through said jet.

14. The turbine according to claim 11, wherein the second body is a rotor body of a low-pressure turbine and the third body is a body of a high-pressure turbine.

15. The turbine according to claim 11, wherein the second chamber is defined by a disc carrying mobile blades of the turbine.

* * * * *